United States Patent [19]

Tecco et al.

[11] Patent Number: 5,044,455
[45] Date of Patent: Sep. 3, 1991

[54] ACTIVELY CONTROLLED TRUCK CAB SUSPENSION

[75] Inventors: Thomas C. Tecco, Ann Arbor, Mich.; Shao-Sheng R. Chu, LaFayette, Ind.

[73] Assignee: Navistar International Transportion Corp., Chicago, Ill.

[21] Appl. No.: 480,989

[22] Filed: Feb. 16, 1990

[51] Int. Cl.⁵ .............................................. B60G 17/00
[52] U.S. Cl. ................................ 180/89.13; 280/707; 188/299
[58] Field of Search ......................... 180/89.13, 89.15; 280/707, 708, 709, 711; 307/10.1; 364/424, 425; 340/436; 188/299

[56] References Cited

U.S. PATENT DOCUMENTS

| | | | |
|---|---|---|---|
| 3,841,694 | 10/1974 | Merkle | 296/35 R |
| 3,944,017 | 3/1976 | Foster | 180/89.15 |
| 3,948,341 | 4/1976 | Foster | 180/89 A |
| 3,966,009 | 6/1976 | Meacock, II et al. | 180/89.15 |
| 3,972,557 | 8/1976 | Hudston et al. | 296/35 R |
| 4,265,328 | 5/1981 | Rowa et al. | 180/89.13 |
| 4,283,087 | 8/1981 | Kauss et al. | 296/190 |
| 4,330,149 | 5/1982 | Salmon | 296/190 |
| 4,372,411 | 2/1983 | Flower | 180/89.15 |
| 4,418,955 | 12/1983 | Muncke et al. | 296/190 |
| 4,438,970 | 3/1984 | Boucher | 296/190 |
| 4,463,818 | 8/1984 | Sonneborn | 180/89.15 |
| 4,468,739 | 8/1984 | Woods et al. | 364/424 |
| 4,506,751 | 3/1985 | Stephens | 180/89.15 |
| 4,648,622 | 3/1987 | Wada et al. | 280/707 |
| 4,717,172 | 1/1988 | Asami et al. | 280/707 |
| 4,717,173 | 1/1988 | Sugasawa et al. | 280/707 |
| 4,753,328 | 6/1988 | Williams et al. | 188/299 |
| 4,862,998 | 9/1989 | Kreft | 180/89.13 |

Primary Examiner—Richard A. Bertsch
Attorney, Agent, or Firm—Dennis K. Sullivan

[57] ABSTRACT

The system is provided for actively controlling the pitching of a truck cab. The system includes sensors and a single point hydraulic actuator mounted at the rear of the cab between the cab and the frame on which the cab is mounted which is computer controlled and activated in accordance with calculations provided by an algorithm programmed into the controller in response to cab or frame pitch acceleration signals received from the sensors. A feedback circuit is also provided which verifies activation of the actuator in accordance with the calculations provided by the algorithm being run in the controller.

22 Claims, 4 Drawing Sheets

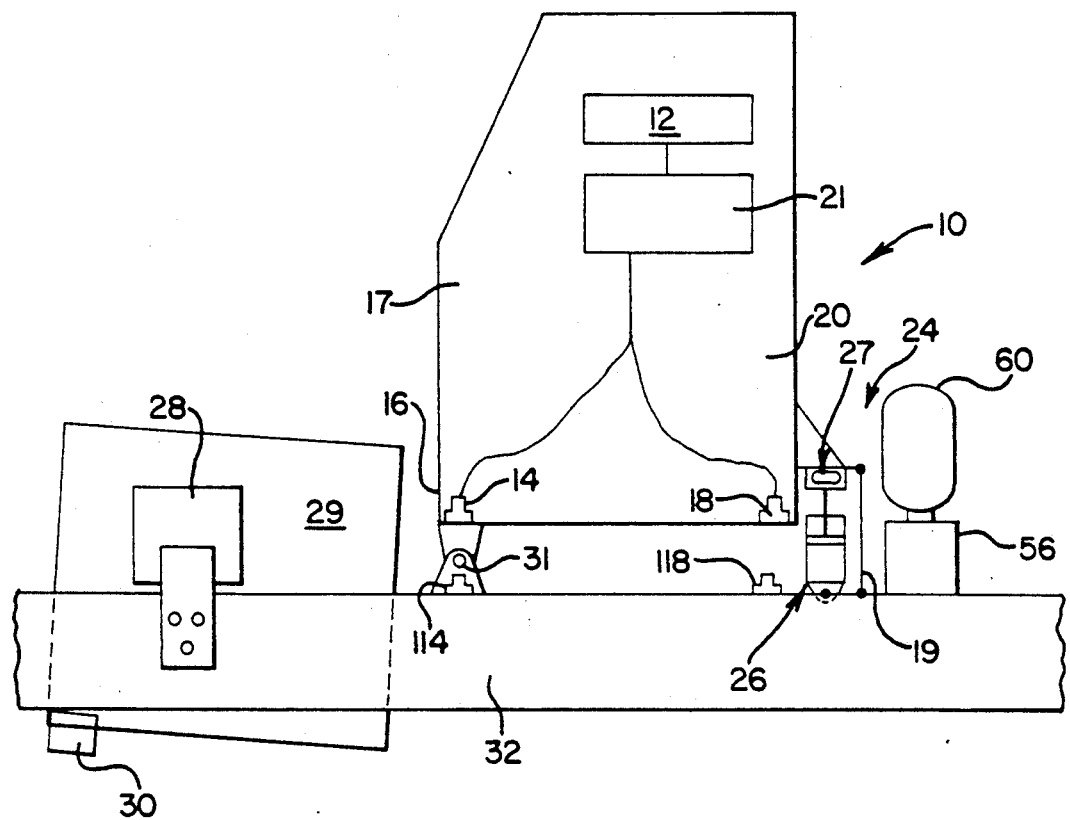
FIG_1_
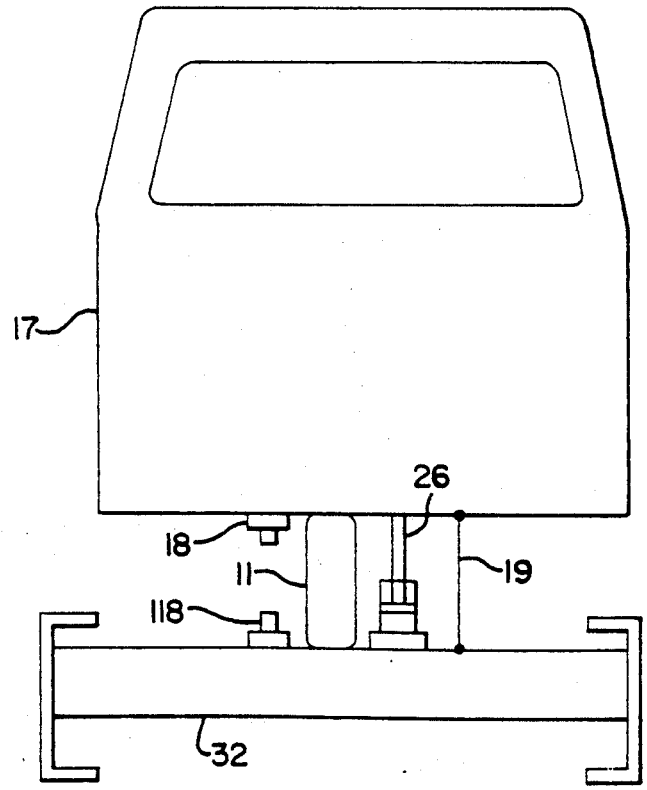
FIG_2_

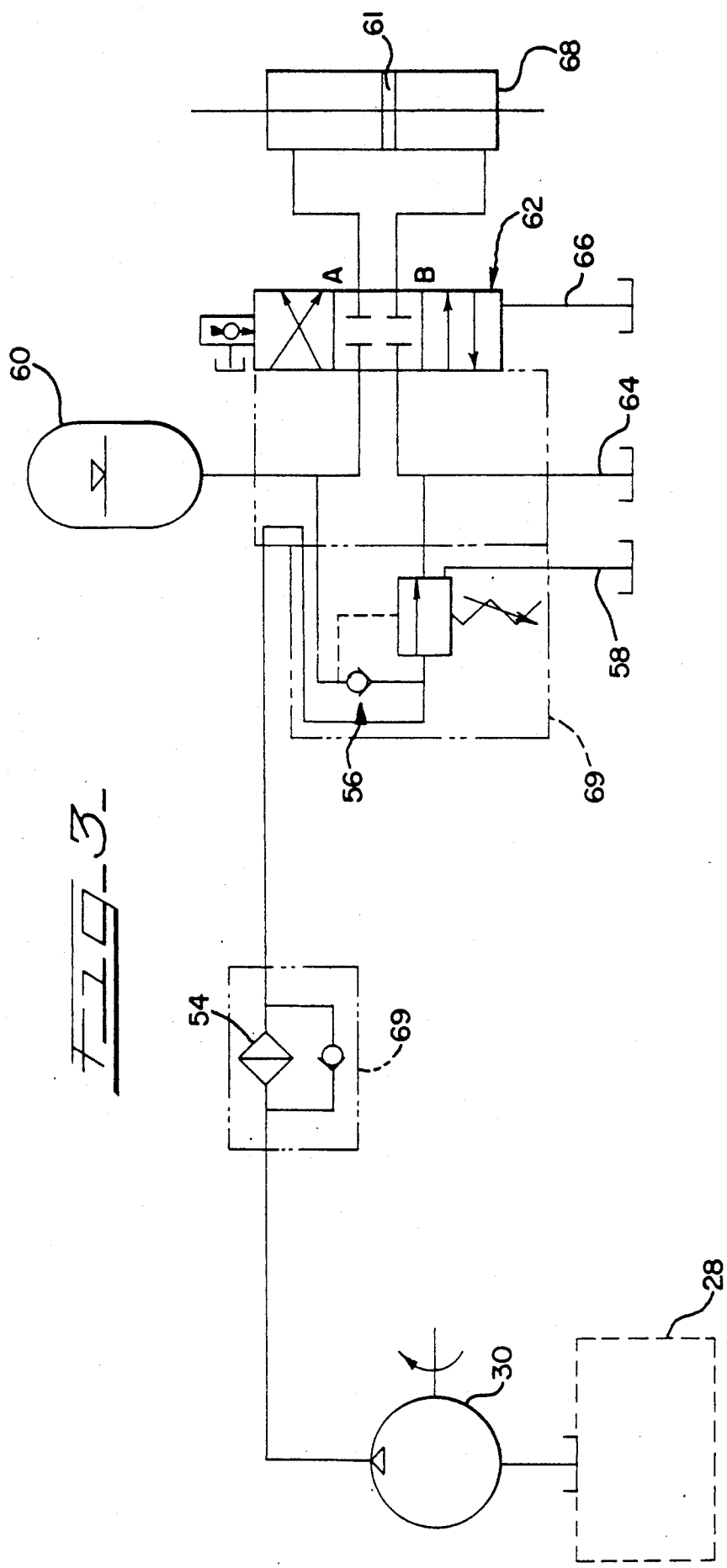

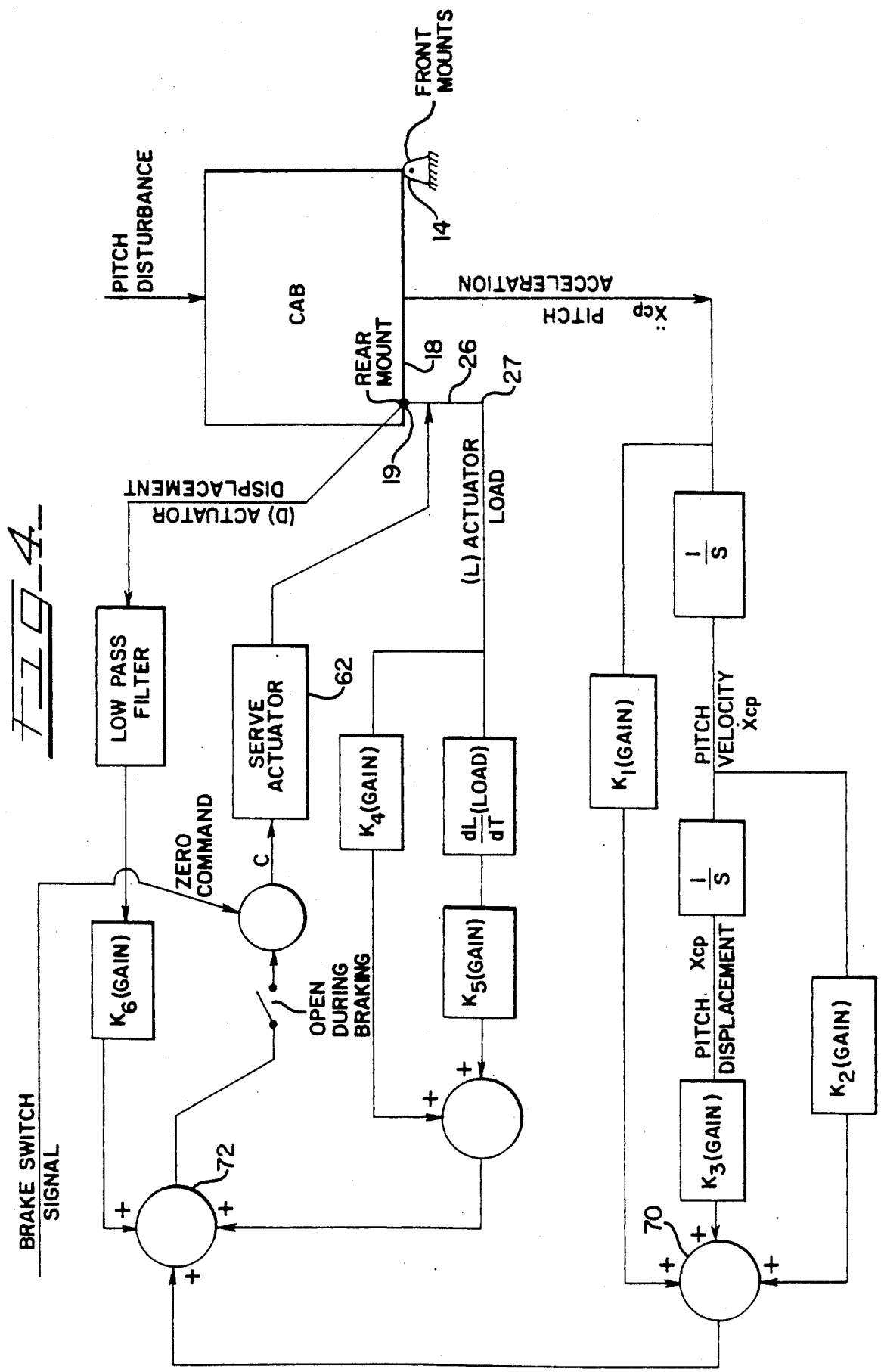

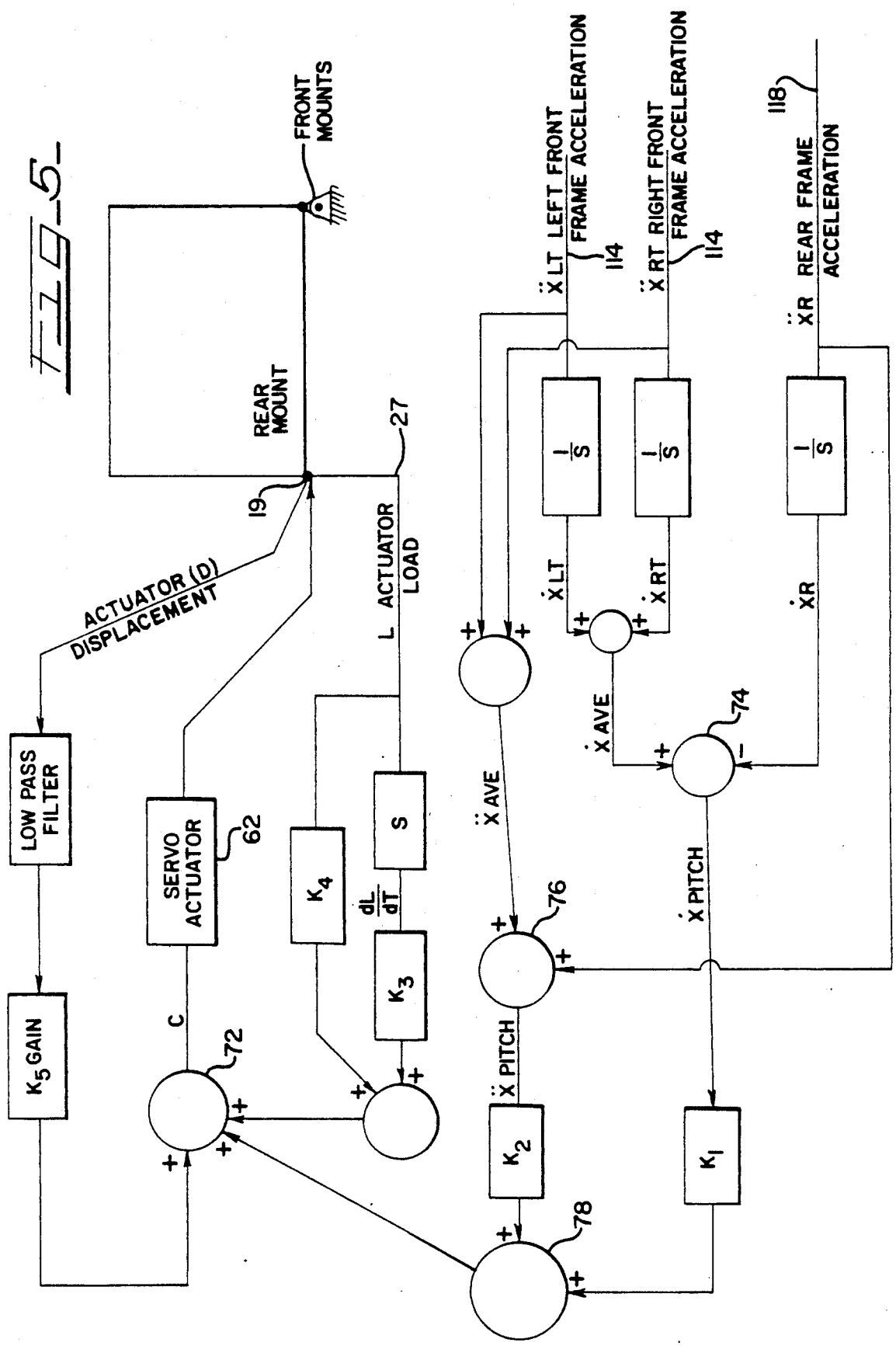

ACTIVELY CONTROLLED TRUCK CAB SUSPENSION

BACKGROUND OF THE INVENTION

The present invention relates to a truck cab suspension system which is under computer control and which significantly reduces the amplitude of cab pitch encountered during operation of a vehicle. More specifically, the invention relates to a suspension system including an actively controlled single point hydraulic cab rear suspension apparatus.

DESCRIPTION OF THE PRIOR ART

Ride quality and operator comfort of a heavy duty vehicle is a function of the operator compartment movement. In particular the operator discomfort is caused by pitch, bounce, and roll motion of the operator compartment. As vehicles operate over normal highway surfaces, the vehicle frame induces motion to the cab causing it to pitch and bounce. Present designs mount the cab semi-rigidly to the frame with rubber isolators or use low frequency isolators (air bags), both of which cause an excessive amount of motion to be transmitted to the cab under many driving conditions.

Heretofore, it has been proposed to control the amplitude of pitch encountered in a moving truck cab by various methods, both active and passive. Some prior methods utilizing active suspension systems are disclosed in the following U.S. patents:

| U.S. Pat. No. | Patentee |
|---|---|
| 3,841,694 | Merkel |
| 3,944,017 | Foster |
| 3,948,341 | Foster |
| 3,966,009 | Meacock II et al |
| 4,183,087 | Kauss et al |
| 4,418,955 | Muncke et al |
| 4,438,970 | Boucher |
| 4,753,328 | Williams et al |

The Merkel U.S. Pat. No. 3,841,694 discloses vehicle cab mounting means which are located at the rear end of the vehicle cab and include an adjustable air spring arrangement for cushioning vibrations and shock loads transmitted from the vehicle frame to the cab. The cushioning effect of the mounting device will depend upon the air pressure within the air springs. And in this regard a source of pressurized air is provided which is connected to the air springs from a conventional height control valve interposed between the source and the air springs. The height control valve automatically maintains a constant cab height relative to the frame by controlling the flow of pressurized air into and out of the air springs. When pressurized air is added to the air springs the rear portion of the cab is urged upwardly toward the frame. An increase in such air pressure within the springs will increase the natural frequency of the mounting device and result in a stiffer ride. On the other hand, when air is exhausted from the springs the springs will tend to lower the rear end of the cab and provide a softer ride.

The Foster U.S. Pat. Nos. 3,944,017 and 3,948,341 disclose a similar suspension for a truck cab in the environment of a tilt cab truck and includes a pair of front and a pair of rear suspension arms that interconnect the cab and the frame. Front air springs are interposed between the front arms and the frame. The rear arms are connected to the frame by releasable latch mechanisms and rear air springs are interposed between the latch mechanisms and the cab. Also an antiroll stabilizer bar extends transversely between the front arms and functions to prevent tilting of the cab about a longitudinal roll axis. A pneumatic pressure source is connected to each of the air springs and a leveling valve associated with each of the front springs regulates the air pressure in those springs and a single leveling valve regulates the pressure of the two rear springs. The air pressure in the front and rear springs is controlled in order to maintain the cab at a constant height above the frame.

The Meacock II et al U.S. Pat. No. 3,966,009 discloses a vehicle cab mounting arrangement including a cab mounted on a frame capable of vibratory beam-bending about at least one nodal point. To minimize the fore and aft motion of the cab caused by the vibratory bending of the frame and pitching of the vehicle, one portion of the cab is resiliently mounted on the frame at or near a nodal point by a pair of pneumatic springs while another portion of the cab is secured to the frame by a pivotal support which transmits to the cab vibratory movement of the frame at the support. Pressurized air is supplied to the pneumatic springs from a conventional leveling valve which automatically controls the flow of air to each pneumatic spring so as to adjust the pressure within the springs in response to the changes in the static loading of the cab so that the springs maintain the rear of the cab at a relatively constant vertical position relative to the frame despite changes in the static loading of the cab. The system also includes two conventional shock absorbers which act to slow cab motion after harsh road disturbances and provide compression and rebound stops.

The Kauss et al U.S. Pat. No. 4,283,087 discloses a support unit for a driver's cab in a utility tractor. The unit actively compensates for any relative movement between chassis and cab by providing at least one support cylinder which is axially rigidly mounted on the chassis with its support piston and flexibly supported on the cab by its cylinder with the cylinder forming a movement-producing unit controlled by a directional control valve connected by a linkage between the cab and frame whose body alternately connects the front side of the support piston to the pressurized side of a constant pressure circuit or to a nonpressurized outlet. Fluid is drained from or admitted to the adjusting cylinder in the event of relative movement between the cab and control valve so that, depending on whether a vehicle drives over a pothole or rising ground, the cylinder is lengthened or shortened in order to maintain the cab at the same height. A hydraulic accumulator is associated with the constant pressure circuit insuring a high specific flow of energy required for supporting the cab. The support unit operates with an extremely rapid response and compensates for any relative movement so that the cab is always maintained in the normal position and does not execute any swinging or racking movements.

The Muncke et al U.S. Pat. No. 4,418,955 discloses a support unit for a cab of a utility tractors which is an improvement on the Kauss patent referred to above. In this embodiment, an absorber element is further provided which has an inelastically adjustable length. Dynamic fluctuations in the distance between the chassis and the cab are opposed by the hydraulic support cylinder unit as defined above, as actuated by the directional control valve. Static fluctuations in the distance between the chassis and cab are accommodated by the hydraulic support cylinder together with the absorber element. The absorber element is provided to reduce the static stress placed on the support unit by the weight of the cab. The absorber element is designed in such a manner that it is rigid for the frequencies of the dynamic stresses so that the joint by which the absorber element is connected to the lever of the unit is like an abutment for the lever. In motions with lower frequencies, the absorber element will yield.

The Boucher U.S. Pat. No. 4,438,970 discloses a vehicle cab suspension wherein the cab is pivotally attached to the chassis at forward first and second spaced apart transversely aligned locations, and a rearward third attachment including a lever having one end coupled to the chassis and its middle coupled to the cab. A spring and hydraulic damper act between the opposite end of the lever and the chassis to apply through the lever resilient force directed against the weight of the cab whereby the cab can oscillate vertically about a forward transverse axis and be rearwardly resiliently supported by the lever. In one embodiment, the spring and hydraulic damper are a pressurized gas type cylinder for adjusting the height of the cab. The pressure of the gas can be varied to adjust the length of the resilient means so that the cab is brought to a level position. Up and down oscillatory movements of the cab occurring as the vehicle is driven are dampened by such resilient means. Automatic leveling control may be accomplished in a known manner by providing a conventional leveling valve.

The Williams et al U.S. Pat. No. 4,753,328 discloses an active vehicle suspension system and damping arrangement therefor. The suspension system proposed is for a road wheel of a vehicle and includes a wheel suspension device having a double acting hydraulic actuator and gas spring in parallel, the gas spring being controllable to provide a selectively variable offset, a sensor arranged to sense load changes experienced by the suspension device and to provide an output dependant thereon, and control assembly responsive to the sensor output to effect adjustment of the hydraulic actuator pending change of the offset of the gas spring to accommodate the load changes. Also disclosed is a damping system for damping movement of a piston within a cylinder, the damping system comprising a valve operable to connect spaces within the cylinder at opposite sides of the piston to fluid pressure and or return lines so as to apply selected positive or negative damping to the movement of the piston. The damping system can be incorporated in the wheel suspension system so that the piston of the hydraulic actuator is damped under control of signals from the control assembly applied to a servovalve of the system.

SUMMARY OF THE INVENTION

As will be described in greater detail hereinafter, the actively controlled single point cab rear suspension system of the present invention differs from previous cab suspension systems in that the suspension system is computer controlled, is adapted to be used on either a conventional or cabover cab, and, if the cab is already suspended, as by an air spring, requires no significant modifications of the primary cab suspension system or vehicle frame. It further differs from previous cab suspensions in that the pitching motion of the cab is sensed and processed to produce a signal which is further combined with actuator load and displacement signals to produce a signal for controlling the cab.

According to the invention, there is provided a single point active cab rear suspension system which serves to limit the pitching of a truck cab during operation of a vehicle on which the cab is mounted. The system, which is intended to assist a primary suspension system, includes accelerometers for sensing the vertical motion of the front and rear ends of the cab, a sensor for sensing the relative vertical displacement of the back of the cab to the frame, circuitry for sending signals from the sensors to a digital or analog computer programmed with an algorithm for processing the signals, and an actuator which is activated in accordance with the output from the computer to level the cab relative to the sensed position signals processed. A feedback circuit from a load cell sensing actuator load is further provided to verify proper activation of the actuator for maintaining the cab level. The algorithm combines pitch acceleration, pitch velocity, and pitch displacement to produce a cab motion signal which is combined with the relative cab displacement signal and the feedback signal from the load cell to produce the output signal to the actuator.

In an alternative algorithm, the frame pitch is sensed at the front and rear of the cab and combined with the cab displacement and load cell feedback signals to control the actuator. This alternative algorithm could be combined with the cab motion algorithm to produce a system wherein both cab and frame motion are sensed. Such a combined system may be optimal in that, due to the relative motion of the cab and frame, the algorithm based on the frame pitch signals would tend to produce a correction signal which is inherently slightly leading the desired reactive motion of the cab produced by the actuator whereas the algorithm based on the cab pitch would produce a correction signal which would inherently lag the desired reactive motion of the cab produced by the actuator.

BRIEF DESCRIPTION OF THE DRAWINGS

Other objects, aims, and advantages of the invention may become more apparent upon a perusal of the detailed description thereof and upon reviewing the drawings, in which:

FIG. 1 is a simplified side view diagram of a truck incorporating the actively controlled suspension system of the present invention;

FIG. 2 is a simplified rear view diagram of a truck incorporating the actively controlled suspension system of the present invention;

FIG. 3 is a schematic diagram of the hydraulic system of the suspension system of FIG. 1;

FIG. 4 is a logic flow diagram of the steps of calculation performed by the algorithm of the present invention for controlling the hydraulic system shown in FIG. 3, for maintaining a vehicle cab level and reducing pitch motion while the vehicle provided with the system of FIG. 1 is in motion; and FIG. 5 is a logic flow diagram similar to FIG. 4 of an alternative algorithm which may be used alone or in combination with the algorithm of FIG. 4.

DESCRIPTION OF THE PREFERRED EMBODIMENT

Referring now to the drawings in greater detail, there is illustrated in FIG. 1 a simplified plan layout of the actively controlled truck cab suspension system 10 of the present invention. As shown in FIG. 2, the truck is further provided with a primary cab suspension system in the form of an air bag 11, or a coil spring, to support the static load imposed by the rear end of the cab. If a conventional levelling valve (not shown) is used to control the air bag 11, the air supply would have to be shut off when the active secondary suspension is operated or, more likely, the levelling valve would also be controlled by the signal controlling the secondary suspension.

The secondary suspension system 10 is actively controlled by an algorithm programmed into a computer or controller 12, as will be described in connection with the description of FIG. 4. The suspension system 10 in its simplest structural configuration for controlled operation by the controller includes front accelerometers 14 (one being shown) mounted to the left and right sides of a front end 16 of a truck cab 17 and a rear accelerometer 18 mounted to a rear end 20 of the truck cab 17 as well as a vertical displacement transducer 19 which measures the distance between the cab rear end 20 and frame 32.

The accelerometers 14 and 18 are disposed to sense movement in the vertical direction and, along with transducer 19, act as sensors for the controller 12 and are in electrical communication therewith, the left and right front accelerometers 14 being combined to produce an average signal. To provide a circuit with greater reliability relative to the sensor readings provided to the controller 12, a signal conditioning circuit 21 may be provided between the output of the accelerometers 14 and 18 and transducer 19 and their respective inputs to the controller 12.

In order to control positioning of the cab 17 of the truck relative to the horizontal, hydraulic system 24, defined in greater detail in connection with the description of FIG. 3, is provided along a center rear end edge position of the cab 17. As will be described in greater detail hereinafter, the hydraulic system 24 includes an actuator 26 which is controllable by the controller 12 to cause vertical incremental movement of the rear end 20 of the cab 17 in response to calculations produced by the algorithm, to move the rear end 20 of the cab 17 up or down, with the movement being verified to the controller 12 by a further sensor, here shown in the form of a load cell 27, forming part of a feedback circuit for the system 10. The hydraulic system 24 is a self sustaining secondary cab suspension system including its own fluid reservoir 28 mounted alongside the engine 29 of the vehicle. The fluid is moved along within the system 24 by a motor driven pump 30 mounted along a frame member 32 of the vehicle, also alongside the engine 29 of the vehicle.

It will be understood from FIGS. 1 and 2 that the hydraulic system 24 is mounted on the frame member 32 of the vehicle and that the cab 17 is in engagement with a portion of the system 24 so as to be movable thereby upon actuation thereof by the controller 12. It will further be understood that the cab 17 is pivotally mounted as at 31 to the frame 32 along the front end edge 16 thereof in the particular embodiment disclosed. The invention would be equally applicable to a vehicle, such as a cab-over-engine truck, wherein the rear end of the cab may be pivotally mounted to the frame and the front end controlled by the actuating means hereof or to a truck wherein the pivotal mount were at some intermediate point between front and rear.

With the structures briefly defined, the algorithm programmed into the controller 12, as defined in FIG. 4, will provide signals to the hydraulic system 24 to function in a particular manner to minimize pitching motion of the cab 17 as will be defined in greater detail hereinafter.

FIG. 3 is a schematic diagram of the hydraulic circuit 24 of the suspension system 10. The fluid reservoir 28 is mounted along a frame rail (not shown) adjacent a tandem hydraulic pump 30 which is gear driven by the engine of the vehicle (not shown). The pump 30 transports fluid from the reservoir 28 first through a filter 54 toward and usually through an unloader valve assembly 56. The unloader valve assembly 56 is provided as a protective measure for the circuit 24. The unloader valve assembly 56 provides means for shunting excess fluid back to the reservoir 28 via a drain line 58 if ever there is an excessive fluid pressure built up within the circuit 24.

The circuit 24 further includes an accumulator 60 which is provided to meet transient requirements relative to flow rate. The circuit 24 then supplies fluid to an inlet of a servovalve member 62. The servo 62 has a first main drain line 64 to the reservoir 28 and a second leakage drain line 66 to the reservoir 28.

Although not shown, the servo 62 is electrically coupled to the controller and receives signals therefrom for operating the cylinder 68. It will be seen that the servo 62 is capable of providing pressurized fluid to either end of the cylinder 68 to provide movement of the piston 61 within the cylinder, in either direction.

The actuator 26 needs to be centered or it will drift to one end of the stoke. This is accomplished by measuring the cab to frame position with transducer 19 and providing a slow acting centering signal to the force servo 62. The feedback signal is the cab pitch acceleration. Pitch acceleration is determined by differencing the average signal of the front accelerometers 14 and the signal of the rear accelerometer mounted on the cab. This signal is also sent to the force servo 62. The actual force is measured with load cell 27 and used as feedback to compare to the force command. This helps ensure that the proper force is developed. The force command signals the servovalve to move thus causing flow to the correct side of the actuator. The filter 54, unloader valve 56, accumulator 60 and servovalve 62 may be mounted on a manifold block 69 at the rear of the cab.

FIG. 4 sets forth a logic flow diagram of the steps taken by the controller in collecting information from the sensors for manipulation and utilization in running an algorithm preprogrammed therein. The algorithm is simply defined as follows:

$$C = K_1 \ddot{X}_{CP} + K_2 \dot{X}_{CP} + K_3 X_{CP} + K_4 L + K_5 \frac{dL}{dt} + K_6 d$$

Where:
  C is the servo command signal;
  $\ddot{X}_{CP}$ is the measured cab pitch acceleration;
  $\dot{X}_{CP}$ is the measured cab pitch velocity;
  $X_{CP}$ is the measured cab pitch displacement;
  L is the actuator load;
  d is the actuator displacement;
  t is time; and,
  $K_1$-$K_6$ are optimal gain settings.

In simpler terms, the control circuit acquires cab motion information from the sensors 14 and 18 which is used to calculate a force that, when applied between the cab and frame, will keep the cab level. The hydraulic system 24 is used to create the force, and feedback from load cell 27 ensures that the calculated force is actually being produced.

The cab motion signals are modified by various gains (defined as K) to obtain an effective motion signal for cab pitch position, cab pitch velocity, and cab pitch acceleration. These three signals are summed at 70, producing an input to the next summing junction 72. At this summing junction, the cab motion signals from junction 70 are combined with the relative cab/frame displacement signal from transducer 19, the actuator load, and the derivative of the actuator load from load cell 27, the relative cab to frame displacement being used to keep the actuator centered. The resulting summation represents the force that the hydraulic cylinder 68 must produce to keep the cab level. It has been found through empirical tests that the suspension system 10 provides a 35% reduction in pitch amplitude of the cab.

In FIG. 5, an alternative algorithm is illustrated which can be used alone, since frame pitch may be directly indicative of cab pitch, in combination with the algorithm defined above and shown in FIG. 4 to achieve additional precision in control of the cab. The alternative algorithm is defined as:

$$C = K_1 X_{FP} + K_2 X_{FP} + K_3 \frac{dL}{dt} + K_4 L + K_5 d$$

and $$X_{FP} = X_{FF} - X_{RF} \quad X_{FP} = X_{FF} - X_{RF}$$

Where:
$X_{FF}$ is the measured averaged frame velocity at the front mount locations;
$X_{FF}$ is the measured average frame acceleration at the front mount locations;
$X_{RF}$ is the measured frame velocity at the rear actuator location;
$X_{RF}$ is the measured frame acceleration at the rear actuator location;
$X_{FP}$ is the frame pitch velocity; and
$X_{FP}$ is the frame pitch acceleration.

Other variables are as defined above; however, the gains $K_1$–$K_5$ may have different values.

In simpler terms, the control circuit acquires frame information from accelerometers 114 and 118 which are disposed on the vehicle frame 32 in the same locations as the cab accelerometers 14 and 18 as shown in FIG. 1. From these signals, the frame pitch input to the cab is calculated. The frame pitch signals from the front accelerometers 114 are averaged and are differenced with the signals from rear accelerometer 118 as at 74 and 76 to produce frame pitch signals which are modified by various gains (defined as K) to obtain an effective motion signals for frame pitch velocity and frame pitch acceleration. These signals are summed at 78 producing an input to the next summing junction 72 whereat it is combined with the relative cab to frame displacement signal from transducer 19 and the actuator load feedback signal from load cell 27 to create a signal to the servovalve 62.

If it is desired to combine the algorithm of FIG. 4 with the algorithm of FIG. 5 to achieve even more precise control of the cab, the output signals from the summing junction 70 of FIG. 4 and from the summing junction 78 of FIG. 5 would both be input to the summing junction 72 of the system. Thereafter, treatment of the signal would be as described above. Naturally, the constants K of the combined algorithms would vary from those of the individual algorithms. As mentioned above, it may be desirable to combine the two algorithms in order to produce more precise control of the cab since the frame pitch output to the cab inherently leads the cab pitch motion and therefore produces a leading signal to the servovalve to take corrective action while the cab pitch motion produces a lagging, but more precisely indicative of cab motion, signal to the servovalve to take corrective action. However, it may turn out that, in practice, the additional precision is not worth the expense of obtaining and processing the additional inputs.

The constants or gains K in the algorithms are variable according to the configuration of the vehicle cab and chassis with which the system 10 is to be used. In this respect, empirical tests are run with a particular vehicle configuration. Each constant is varied in sequence until a particular setting of constants is determined which provides the desired amount of cab pitch, which may be not the least pitch if it is desired to provide a "seat of the pants" feedback to the truck operator. Once the set of constants has been determined, these are programmed into the controller to be used with the particular vehicle.

It will further be noted that the active suspension system 10 produces a zero displacement command signal during the braking of the vehicle to maintain the cab level during braking. This can be accomplished by providing a sensor in the brake line which, when sensing braking, will cause the servovalve to stop operating, thus locking the piston in place. The same locking may be programmed to take place during operation of the clutch in a similar manner to maintain the cab level during acceleration.

The actively controlled cab suspension system 10 of the present invention has a number of advantages, some of which have been described above and others of which are inherent in the invention. Also, modifications may be made to the system 10 without departing from the teachings herein. For example, the hydraulic actuator could be replaced by a linear motor, a motor and ball screw or a moving coil actuator. The only modification required for such replacement would be elimination of the hydraulic system with controller output being directly connected to such device. However, additional electrical power conditioning may be necessary for electrically operated actuators. Accordingly, the scope of the invention is only to be limited as necessitated by the accompanying claims.

We claim:

1. A suspension system for actively controlling the pitch of a truck cab of a truck having a frame comprising:

means for connecting the cab to the frame while permitting controlled relative movement therebetween;

cab pitch sensing means operatively disposed to provide output signals indicative of the pitch of said cab, said cab pitch sensing means comprising vertical acceleration sensing means operatively disposed to provide output signals indicative of accelerations experienced respectively at a front portion and at a rear portion of said cab;

actuator means disposed between said frame and said truck cab adjacent a rear end thereof, said actuator means being capable of selectively raising or lowering said rear end edge of said cab relative to said frame upon activation thereof; and automatic control means in communication with said sensing means and with said actuator means, said control means to produce a control signal output means responsive to said cab pitch signal to effect activation of said actuator means to move said rear end of said cab to reduce the pitching movement thereof, said control means including differencing means responsive to said output signals from said acceleration sensing means to produce said cab pitch signal.

2. The invention in accordance with claim 1 and said cab pitch signal comprising the combination of a cab pitch acceleration signal, a cab pitch velocity signal, and a cab pitch displacement signal, said cab pitch displacement and velocity signals being derived from said cab pitch acceleration signal.

3. The invention in accordance with claim 2 and means associated with said actuator means for providing a feedback signal indicative of the load applied thereby, said feedback signal being combined with said cab pitch signal by said control signal output means to produce said control signal.

4. The invention in accordance with claim 3 and a vertical position sensor for providing an output signal indicative of the relative position of the cab to the frame to a centered position therebetween, said sensor providing an output signal to said control signal output means for combining with said control signal to provide a centering signal to said actuator means.

5. The invention in accordance with claim 4 and said vertical acceleration sensing means being mounted on said cab at said front portion and said rear portion.

6. The invention in accordance with claim 5 wherein said control means comprises a microprocessor connected to said sensing means and to said control means, said microprocessor having the following algorithm preprogrammed therein:

$$C = K_1 \ddot{X}_{CP} + K_2 \dot{X}_{CP} + K_3 X_{CP} + K_4 L + K_5 \frac{dL}{dt} + K_6 d$$

Where:
C is the servo command signal;
$\ddot{X}_{CP}$ is the measured cab pitch acceleration;
$\dot{X}_{CP}$ is the measured cab pitch velocity;
$X_{CP}$ is the measured cab pitch displacement;
L is the actuator load;
d is the actuator displacement;
t is time; and,
$K_1$-$K_6$ are optimal gain settings.

7. The invention in accordance with claim 4 and said vertical acceleration sensing means comprising sensors mounted on said truck frame adjacently below said front and rear portions of said cab.

8. The invention in accordance with claim 7 wherein said control means comprises a microprocessor connected to said sensing means and to said control means, said microprocessor having the following algorithm preprogrammed therein:

$$C = K_1 \ddot{X}_{FP} + K_2 \dot{X}_{FP} + K_3 \frac{dL}{dt} + K_4 L + K_5 d$$

and

-continued
$$\dot{X}_{FP} = \dot{X}_{FF} - \dot{X}_{RF} \quad \ddot{X}_{FP} = \ddot{X}_{FF} - \ddot{X}_{RF}$$

Where:
$\dot{X}_{FF}$ is the measured averaged frame velocity at the front mount locations;
$\ddot{X}_{FF}$ is the measured average frame acceleration at the front mount locations;
$\dot{X}_{RF}$ is the measured frame velocity at the rear actuator location;
$\ddot{X}_{RF}$ is the measured frame acceleration at the rear actuator location;
$\dot{X}_{FP}$ is the frame pitch velocity;
$\ddot{X}_{FP}$ is the frame pitch acceleration;
L is the actuator load;
d is the actuator displacement;
t is time; and,
$K_1$-$K_5$ are optimal gain settings.

9. The system of claim 1 wherein said actuator means comprises a hydraulic piston and cylinder arrangement positioned between said cab and said frame.

10. The system of claim 9 wherein said actuator means further includes a servovalve member to which said control signal is supplied, said servovalve member being in communication with said piston and cylinder assembly to operate same in accordance with the control signal received.

11. The system of claim 10 wherein said servovalve member has a fluid supply line leading thereto, a main fluid return line leading to a reservoir for the fluid and a leakage fluid return line leading to said reservoir.

12. The system of claim 11 further including an unloader valve in said fluid supply line for unloading fluid back to said reservoir in the event of an excessive fluid pressure buildup.

13. The system of claim 11 further including an accumulator upstream of said servovalve member for providing an instantaneous increase in fluid flow when required.

14. The system of claim 10 wherein said servovalve member has two fluid outlet conduits, one supplying fluid to each end of said cylinder, said servovalve member being capable of moving said piston in either direction within said cylinder.

15. The system of claim 10 wherein said piston is maintained against banging at either end of its stroke by a signal input to said servovalve member from said controller.

16. The system of claim 1 including an accelerometer mounted and positioned centrally transversely on said cab.

17. The system of claim 1 further including a vertical displacement sensor for providing an output signal indicative of the relative position of the cab to the frame to a centered position therebetween, said sensor providing an output signal to said control signal output means for combining with said control signal to provide a centering signal to said actuator means.

18. The system of claim 1 further including a load cell associated with said actuator means for providing a feedback signal indicative of the load applied thereby, said feedback signal being combined with said cab pitch signal by said control signal output means to produce said control signal.

19. A suspension system for actively controlling the pitch of a truck cab of a truck having a frame comprising:

means for connecting the cab to the frame while permitting controlled relative movement therebetween;

vertical acceleration sensing means operatively disposed to provide output signals indicative of accelerations experienced respectively at a front portion and at a rear portion of said cab;

actuator means disposed between said frame and said truck cab adjacent a rear end thereof, said actuator means being capable of selectively raising or lowering said rear end edge of said cab relative to said frame upon activation thereof;

a load cell associated with said actuator means for providing a feedback signal indicative of the load applied thereby; and a microprocessor in communication with said sensing means, load cell, and with said actuator means, said microprocessor responsive to said output signals from said acceleration sensing means to producing a cab pitch signal, said cab pitch signal comprising the combination of a cab pitch acceleration signal, a cab pitch velocity signal, and a cab pitch displacement signal, said cab pitch displacement and velocity signals being derived from said cab pitch acceleration signal, and said feedback signal to produce a control signal to said actuator means to effect activation of said actuator means to move said rear end of said cab to reduce the pitching movement thereof.

20. The invention in accordance with claim 19 further including a vertical displacement sensor for providing an output signal indicative of the relative position of the cab to the frame to a centered position therebetween, said sensor providing an output signal to said control signal output means for combining with said control signal to provide a centering signal to said actuator means.

21. The invention in accordance with claim 20 wherein said microprocessor operates in accordance with the following algorithm preprogrammed therein:

$$C = K_1 \ddot{X}_{CP} + K_2 \dot{X}_{CP} + K_3 X_{CP} + K_4 L + K_5 \frac{dL}{dt} + K_6 d$$

Where:
C is the servo command signal;
$\ddot{X}_{CP}$ is the measured cab pitch acceleration;
$\dot{X}_{CP}$ is the measured cab pitch velocity;
$X_{CP}$ is the measured cab pitch displacement;
L is the actuator load;
d is the actuator displacement;
t is time; and,
$K_1$-$K_6$ are optimal gain settings.

22. The invention in accordance with claim 20 wherein said microprocessor has the following algorithm preprogrammed therein:

$$C = K_1 \dot{X}_{FP} + K_2 \ddot{X}_{FP} + K_3 \frac{dL}{dt} + K_4 L + K_5 d$$

and $$\dot{X}_{FP} = \dot{X}_{FF} - \dot{X}_{RF} \quad \ddot{X}_{FP} = \ddot{X}_{FF} - \ddot{X}_{RF}$$

Where:
$\dot{X}_{FF}$ is the measured averaged frame velocity at the front mount locations;
$\ddot{X}_{FF}$ is the measured average frame acceleration at the front mount locations;
$\dot{X}_{RF}$ is the measured frame velocity at the rear actuator location;
$\ddot{X}_{RF}$ is the measured frame acceleration at the rear actuator location;
$\dot{X}_{FP}$ is the frame pitch velocity;
$\ddot{X}_{FP}$ is the frame pitch acceleration;
L is the actuator load;
d is the actuator displacement;
t is time; and,
$K_1$-$K_5$ are optimal gain settings.

* * * * *